Patented Mar. 16, 1943

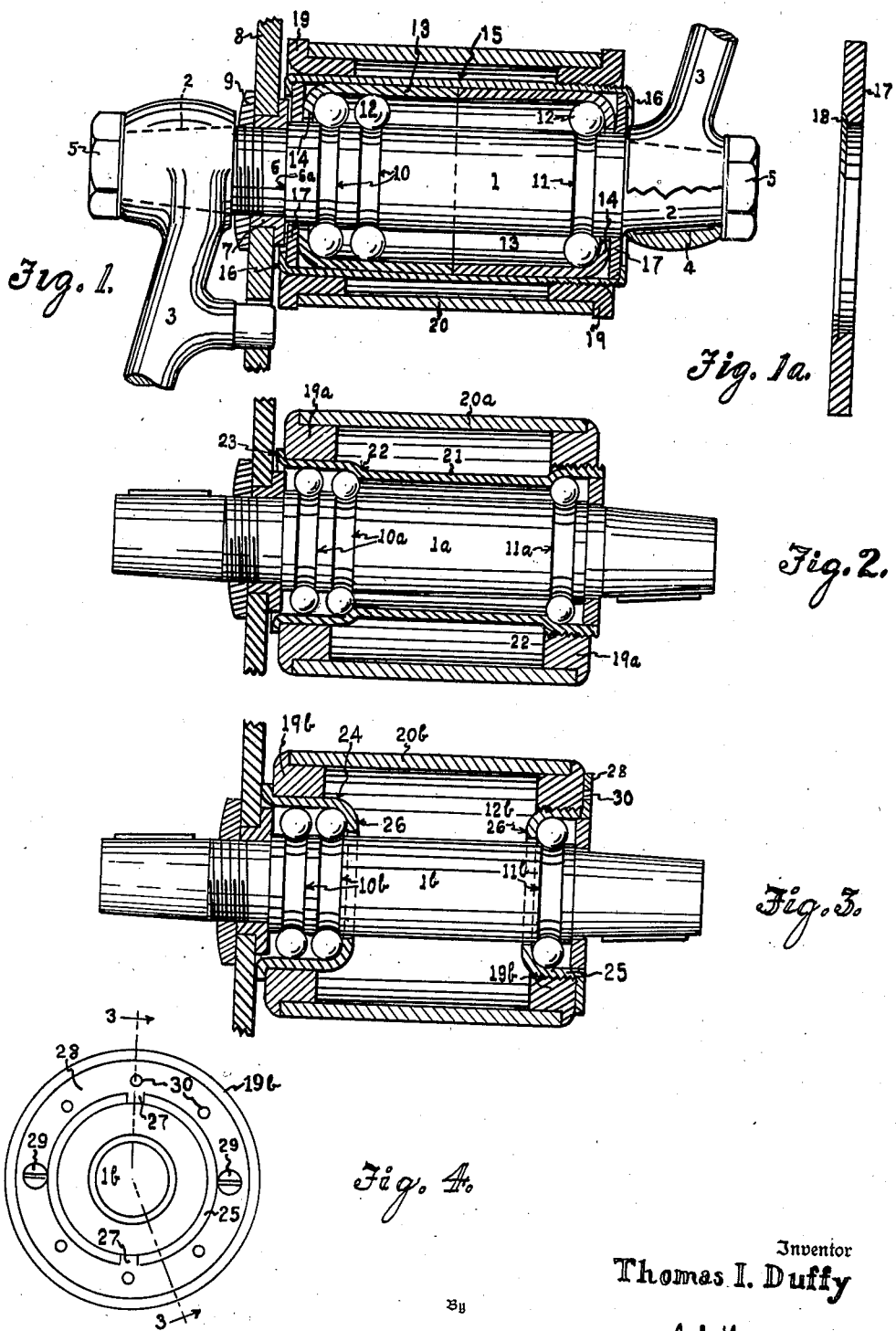

2,314,133

UNITED STATES PATENT OFFICE 2,314,133

CRANKSHAFT MOUNTING

Thomas I. Duffy, Detroit, Mich., assignor to Delray Manufacturing Company, Detroit, Mich., a corporation of Michigan Application January 2, 1941, Serial No. 372,733

5 Claims. (Cl. 308—179.5)

This invention relates to crank shaft mountings and particularly mountings for bicycle crank shafts.

In practice heretofore followed in bicycle construction, the crank shaft has been commonly journaled in anti-friction bearings, designed without consideration of fact that stresses imposed upon drive-transmitting end of the crank shaft materially exceed stresses acting at other end.

An object of the present invention is to journal a crank shaft and particularly a bicycle crank shaft in anti-friction bearings, and to suitably differentiate the bearings for the shaft extremities so that their load areas will at least approximately conform to transmitted stresses.

Another object is to provide an anti-friction bearing for a shaft employing two or more adjacent sets of balls and to simplify installation by eliminating at least one of the usual ball races.

These and various other objects are attained by the invention hereinafter described and illustrated in the accompanying drawing, wherein:

Fig. 1 is an axial sectional view of a crank shaft mounting embodying one form of my invention.

Fig. 1a is an enlargement of a washer shown in Fig. 1.

Fig. 2 is a similar view disclosing the invention in modified form.

Fig. 3 is a similar view taken on the line 3—3 of Fig. 4, showing a further modification.

Fig. 4 is an end view of the construction shown in Fig. 3.

In the construction shown in Fig. 1, the reference character 1 designates a bicycle crank shaft formed with reduced tapered end portions 2 receiving crank arms 3. Said arms are suitably keyed to the shaft, as indicated at 4, and are held in place by headed bolts 5 tapped into the shaft extremities. Adjacent to one of the portions 2, the cylindrical main portion of the shaft is reduced in diameter as indicated at 6, thereby forming an annular shoulder 6a, and an adapter ring 7 engaging the reduced portion 6 serves to mount usual sprocket wheel 8. A nut 9 threaded on the portion 6 engages said sprocket wheel to clamp the ring 7 against shoulder 6a.

The cylindrical main portion of the shaft is formed adjacent to the sprocket wheel with two annular grooves 10 and has another annular groove 11 remote from the sprocket wheel. The three described grooves form races receiving three sets of balls 12 journaling the shaft within a pair of elongated stationary cups 13 having inner ends abutting substantially midway of the shaft length. The outer ends of such cups are inwardly flanged, as indicated at 14, to closely approach the shaft. Said flanges in forming their ninety-degree inward bends are curved to conform to and engage the single set of balls mounting one end of the shaft and the outermost of the two adjoined sets. Snugly fitted over the two cups 13 is a cylindrical shell 15 having inwardly flanged ends 16 retaining washers 17 in engagement with the cup flanges 14. Said washers have a slight clearance from the shaft and their inner peripheries are grooved, as indicated at 18, adjacent the flanges 14 for a purpose hereinafter explained. Embracing the extremities of the shell 15 are a pair of outwardly flanged adapter rings 19, one welded to the shell and the other threaded thereupon. These are adapted to fit snugly into the ends of the cylindrical crank shaft housing 20, which is a necessary part of a bicycle frame (not shown).

A decidedly valuable feature of the described construction is its simplicity and ease of assembly. The balls 12 are first engaged in the grooves 10 and 11, and the cups 13 are then slipped over opposite ends of the shaft and advanced to their illustrated mutually abutting position. The washers 17 are then applied and finally the shell 15 is slapped over the cups and its ends are flanged inwardly to engage the washers. The grooves 18 fill up with lubricant and tend to prevent any outward escape of lubricant past the washers. Location of these grooves in the washers permits them to be quite inexpensively formed by a stamping or coining operation. The abutting relation of the cups 13 is important in assuring a highly accurate spaced relation of the ball-engaged flanges 14.

In the construction shown in Fig. 2, the crank shaft 1a, grooves 10a and 11a, adapter rings 19a, and cylindrical housing 20a substantially conform to preceding description. Outer race members for the balls are formed, however, by enlarged end portions of a sleeve 21, which forms curved annular shoulders 22 fitted to the inner faces of the sets of balls engaging the groove 11a and innermost groove 10a. The sleeve 21 is formed at one end with an exterior flange 23 seating against the adapter ring 19a at that end and the other end of said sleeve is exteriorly threaded for engagement by the other adapter ring. Thus the latter may be powerfully forced on the sleeve to clamp both adapter rings tightly against the ends of the housing 20a. In assembling this construction, the sleeve 21 is slipped over the shaft 1a after the grooves 10a have been engaged by the corresponding sets of balls. Loading of the balls in the groove 11a is accomplished preferably by forming the shaft with a loading groove (not shown) such as is common in this art, such groove permitting individual insertion of the balls and being extended from the groove 11a a sufficient distance toward the adjacent shaft end to provide for such insertion.

In the further modification shown in Fig. 3, the shaft 1b, grooves 10b and 11b, adapter rings 19b, and cylindrical housing 20b conform to preceding description. Separate cups 24 and 25 are employed, however, to provide outer race members for the double and single sets of balls 12b, said cups having their inner ends formed within inturned flanges 26 curved to fit the inner faces of the sets of balls engaging the groove 11b and innermost groove 10b. The cup 24 is exteriorly flanged at its outer end to seat against the corresponding adapter ring 19b and the cup 25 is exteriorly threaded to engage the corresponding adapter ring. The cup 25 is held properly adjusted relative to the corresponding adapter ring by forming a pair of diametrically opposed notches in the outer end of said cup and engaging said notches by a pair of tongues 27 inwardly projecting from a ring 28 secured by screws 29 to the outer face of the adjacent adapter ring. To afford the ring 28 different rotative positions and thus permit a more accurate adjustment of the cup 25, several pairs of opposed openings 30 are formed in the ring 28 for selective engagement by the screws 29.

In each of the described forms of the invention, the antifriction bearing surface provided at the sprocket wheel end of the shaft is twice that provided for the other end of said shaft, thus amply taking care of the relatively heavy stresses imposed at the drive-transmitting end. Also, in each described construction, the installation of the double set of balls is unique in that the balls of one set are laterally free in engaging the outer ball race. This avoids the extreme accuracy which would be necessary if the outer race member provided for lateral engagement with both adjacent sets of balls, and also facilitates assembly. It is a highly desirable feature of the invention, in each of its described forms, that the shaft with the balls, cups, and adapters may be completely and accurately assembled at point of manufacture, and the assembly need not be disturbed in effecting its proper installation in the frame of a bicycle.

The invention is presented as including all such changes and modifications as come within the scope of the following claims.

What I claim is:

1. In a crank shaft mounting, the combination with a crank shaft having each of its end portions grooved to form a ball race, a set of balls engaging in each such ball race, a sleeve fitted over said sets of balls and providing outer races therefor, and formed with spaced annular shoulders disposed between and engaging the two sets of balls, and means for supporting said sleeve and fixing it relative to the shaft.

2. In a crank shaft mounting as set forth in claim 1, a pair of adapter rings fitting over the ends of said sleeve, one end of said sleeve being outwardly flanged to engage the adapter ring at such end and the other having screw-threaded engagement with corresponding adapter ring.

3. In a crank shaft mounting, the combination with a bearing sleeve and a crank shaft coaxial with and journaled in said sleeve, of a set of balls in each end portion of the sleeve, mounting the shaft, the sleeve having annular shoulders disposed between and engaging said ball sets, and restraining such sets from movement toward each other, and another set of balls disposed outwardly of one of the first mentioned sets in the corresponding end portion of the sleeve, and additionally mounting the shaft, the shaft being annularly grooved to form inner race-ways for the ball sets, and the sleeve forming an outer raceway.

4. In a shaft mounting, the combination with a shaft, at least three sets of balls journaling said shaft, of an outer race-way provision for said ball sets, the shaft being annularly grooved to form inner race-ways for the ball sets, and said outer race-way provision including two reversely facing annular shoulders engaging two of said ball sets, whereby said shoulders act through the engaged ball sets to resist stresses acting axially of the shaft, and said ball sets are maintained in properly spaced relation.

5. In a crank shaft bearing, the combination with a crank shaft formed with spaced annular grooves serving as ball races, of two sets of balls respectively engaged in the respective ball races, a sleeve fitting over both sets of balls and providing outer races therefor, said sleeve being of reduced diameter between said ball sets and thereby forming annular shoulders engaging said ball sets and positioning them axially of the sleeve, and means for fixedly supporting and positioning said sleeve relative to the shaft.

THOMAS I. DUFFY.